Patented Feb. 6, 1945

2,368,894

UNITED STATES PATENT OFFICE 2,368,894

PREPARATION OF ALKALI-METAL ω-CYANOGUANIDODITHIOCARBONATES

Russell L. Sperry, Stamford, Conn., assignor to American Cyanamid Company, New York, N. Y., a corporation of Maine No Drawing. Application June 7, 1943,
Serial No. 489,984

5 Claims. (Cl. 260—500)

This invention relates to the preparation of alkali metal ω-cyanoguanidodithiocarbonates.

I have discovered that the alkali metal salts of ω-cyanoguanidodithiocarbonic acid may be easily and efficiently prepared by mixing dicyandiamide, carbon disulfide and an alkali metal hydroxide in the presence of a water miscible, non-hydroxylated organic liquid such as acetone, pyridine or the like. The alkali metal ω-cyanoguanidodithiocarbonates are believed to have the following general formula:

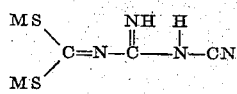

in which M is an alkali metal radical. The formula represents the most probable structure of these compounds and they are named accordingly. It is quite likely, however, that the compounds may exist in whole or in part in one or more tautomeric forms, for example:

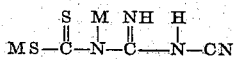

Other possible tautomeric forms for these compounds could also be suggested and accordingly I do not wish to be bound by the particular structure set forth. The term alkali metal ω-cyanoguanidodithiocarbonate is intended therefore to include those compounds resulting from the reaction described by me herein regardless of whatever tautomeric form they may exist in.

The reaction employed by me to prepare alkali metal ω-cyanoguanidodithiocarbonates may be illustrated by the following equation:

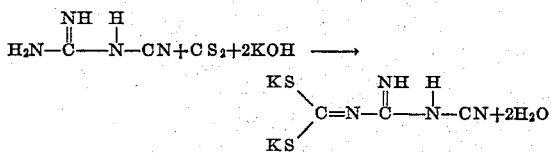

The reaction of dicyandiamide and carbon disulfide with other alkali metal hydroxides takes place similarly.

In carrying out my new reaction I prefer to suspend pulverized dicyandiamide and an alkali metal hydroxide in a water miscible, non-hydroxylated organic liquid and add carbon disulfide thereto in amount sufficient to complete the reaction as indicated by the preceding equation. Of the various organic liquids which may be employed, I prefer acetone or pyridine because of the almost quantitative yields obtained when using these solvents. Other organic liquids may be used however, such as alpha, beta, gamma-picoline, quinoline, 2,4-lutadiene, methyl-ethyl ketone, etc. with less effectiveness.

The reaction is unique in that dicyandiamide and the alkali metal hydroxides are insoluble in these organic liquids. At the start of the reaction, I have therefore a slurry of dicyandiamide and alkali metal hydroxide in, for example, acetone. As carbon disulfide is added to this slurry the liquid phase becomes yellow and the dicyandiamide particles are covered with a yellow material. As the reaction proceeds the character of the slurry becomes changed. A voluminous insoluble material composed of micro-crystals of alkali metal ω-cyanoguanidodithiocarbonate appears. Upon completion of the reaction, the slurry may be filtered and the yellow precipitate washed with acetone, alcohol or the like.

The reaction takes place readily over a wide range of temperatures. The higher temperatures, above 65° C., should be avoided since the product has a tendency to decompose at elevated temperatures. Ordinarily temperatures ranging from —10° to 65° C. may be employed. Under these temperature conditions the reaction may require from 10 to 12 hours at —10° C. to ¼ to ½ hour at 60° C. At 15° to 20° C., the reaction is usually complete in 15 minutes to 1 hour, the time depending somewhat upon the agitation of the reaction mixture, the physical condition of the dicyandiamide and the alkali metal hydroxide and the quantity of the reactants.

My invention will now be illustrated in greater detail by means of the following examples. It should be understood however, that these examples are given for the purpose of illustration and are not to be construed as limiting my invention to the particular details described therein.

Example 1

A slurry of 210 g. (2.5 moles) of dicyandiamide in 1.5 liters of acetone was cooled to 3° C. in a three-liter, three-necked flask equipped with thermometer, stirrer, and reflux condenser. The flask was immersed in an ice-water bath to well above the level of the acetone, and the stirrer was set as close to the bottom of the flask as possible. 330 g. (5.0 moles) of 85% potassium hydroxide pellets and 200 g. (2.65 moles) of carbon disulfide were added with vigorous stirring. Before long the temperature began to rise steadily and the slurry became pale yellow. After three-fourths of an hour the temperature was 17° C. and the slurry had become a thick mush of the insoluble yellow product. In one and one-half hours the temperature had dropped to 10° C., the ice-water bath was removed and the temperature allowed to rise to 20° C., where it was maintained for another hour. The product was filtered, reslurried in a liter of cold acetone, filtered, washed with acetone, and dried in a vacuum desiccator overnight. The dried product weighed 587 g., which represented a 99.8% yield of the crude dipotassium ω-cyanoguanidodithiocarbonate. It was a canary yellow, microcrystalline product, highly soluble in water. The decomposition temperature varied from 168°–174° C., depending on the rate of heating of the sample.

*Example 2*

21 g. dicyandiamide, 20 g. sodium hydroxide pellets, 19.0 g. of carbon disulfide and 250 cc. acetone were mixed and allowed to react for one hour at 10° C. The temperature of the reaction mixture was then raised to 25° C. and the reaction continued for one more hour. Disodium ω-cyanoguanidodithiocarbonate was recovered as a pale yellow, sticky solid mass in fair yields.

*Example 3*

21 g. dicyandiamide, 20 g. sodium hydroxide pellets, 19.0 g. of carbon disulfide and 250 cc. acetone and 2 g. water were mixed at room temperature in a reaction vessel. The temperature of the reaction mixture rose to 33° C. in one-half hour whereupon it was cooled and maintained at 20–25° C. for one and one-half hours. Disodium ω-cyanoguanidodithiocarbonate was recovered as before but with better yields.

*Example 4*

21 g. of dicyandiamide, 33 g. of 85% KOH and 19 g. of $CS_2$ were mixed in 100 cc. pyridine and stirred at 30 to 35° C. for 2 hours. At first the reaction mixture became yellow in color and within a few minutes the undissolved material appear to increase in volume. Finally a fluffy, voluminous, insoluble material was obtained which made the reaction mixture a thick mushlike mass of yellow microcrystalline dipotassium ω-cyanoguanidodithiocarbonate. The pyridine was then removed from the reaction mixture by filtration followed by washing with acetone. Dipotassium ω-cyanoguanidothiocarbonate was obtained in yields greater than 88%.

Other alkali metal salts of ω-cyanoguanidodithiocarbonate may be prepared in like manner by the use of other alkali metal hydroxides such as lithium hydroxide, rubidium hydroxide and caesium hydroxide. All of the alkali metal ω-cyanoguanidodithiocarbonates are similar in physical characteristics being pale yellow solids extremely water soluble.

If desired, the alkali metal ω-cyanoguanidodithiocarbonates may be further purified by the following procedure. The desired alkali metal ω-cyanoguanidodithiocarbonate is dissolved in water and the solution acidified with, for example, acetic or hydrochloric acid. Upon acidification, a precipitate believed to be 2-thio-4,6-diamino-1,3,5-thiadiazine is immediately obtained. This precipitate is practically insoluble in cold water, alcohol, acetone and other common solvents, and may be washed therewith to remove unreacted dicyandiamide, alkali metal salts and hydroxides and other impurities. The washed material may then be added to a dilute solution of a desired alkali metal hydroxide in ethyl alcohol. A precipitate of the alkali metal ω-cyanoguanidodithiocarbonate is formed at once. This product may be filtered and washed with alcohol or acetone and dried.

What I claim is:

1. A method of preparing alkali metal ω-cyanoguanidodithiocarbonates which comprises mixing an alkali metal hydroxide, dicyandiamide and carbon disulfide in the presence of a water soluble, non-hydroxylated organic liquid.

2. A method of preparing alkali metal ω-cyanoguanidodithiocarbonates which comprises mixing an alkali metal hydroxide, dicyandiamide and carbon disulfide in the presence of acetone.

3. A method of preparing alkali metal ω-cyanoguanidodithiocarbonates which comprises mixing an alkali metal hydroxide, dicyandiamide and carbon disulfide in the presence of pyridine.

4. A method of preparing dipotassium ω-cyanoguanidodithiocarbonate which comprises mixing together dicyandiamide, potassium hydroxide and carbon disulfide with acetone.

5. A method of preparing disodium ω-cyanoguanidodithiocarbonate which comprises mixing together dicyandiamide, sodium hydroxide and carbon disulfide with acetone.

RUSSELL L. SPERRY.